2,971,965

OIL ADDUCTS

Willard H. Kirkpatrick, Sugar Land, and Virgil L. Seale and Robert E. Law, Houston, Tex., assignors to Visco Products Company, Houston, Tex., a corporation of Delaware No Drawing. Filed Aug. 26, 1958, Ser. No. 757,182

7 Claims. (Cl. 260—398)

This invention relates to a new composition of matter and more particularly to an adduct of a mixture of ethylene oxide and 1,2-propylene oxide with castor oil.

One of the objects of the invention is to provide new and improved compositions which retain their fluidity at low temperatures.

Another object of the invention is to provide new and improved compositions which are especially suitable for use as heavy duty brake fluids.

Still a further object of the invention is to provide new and useful compositions which are useful as textile lubricants.

Another object of the invention is to provide new and improved compositions which are useful as emulsifiers for agricultural chemicals. Other objects will appear hereinafter.

In accordance with the invention it has been found that when mixtures of ethylene oxide and 1,2-propylene oxide are added to castor oil in certain predetermined proportions new and useful compositions are obtained which are characterized by liquidity and stability at very low temperatures. These compositions are especially useful as heavy duty brake fluids and for other purposes where hydraulic fluids are employed and where such fluids are apt to be exposed to very low temperatures. They are also useful as textile lubricants, as emulsifiers for agricultural chemicals and for other uses.

For the purpose of the invention it has been found that the ethylene oxide and 1,2-propylene oxide must be mixed before adding them to the castor oil, or, in other words, the castor oil must be reacted with a mixture of the ethylene oxide and 1,2-propylene oxide. The total amount of the mixture employed must be such that the total mixed oxide content of the finished adduct is within the range of 25% to 75% by weight and preferably within the range of 40% to 60% by weight. The weight ratio of ethylene oxide to 1,2-propylene oxide should be within the range of 2:1 to 1:2, preferably 3:2 to 2:3. The optimum ratio of ethylene oxide to propylene oxide is approximately 60% by weight of ethylene oxide to 40% by weight of 1,2-propylene oxide in an adduct of castor oil wherein the total weight of mixed oxides based on the finished product is within the range of 45% to 60% by weight.

The general methods used in preparing the adducts by oxyalkylation of castor oil involve first mixing the ethylene oxide and 1,2-propylene oxide and then feeding the mixture into the castor oil as rapidly as it will react while preferably maintaining a temperature of 150° C. to 160° C. and a pressure within the range of 40 to 60 pounds per square inch gauge. The reaction is preferably effected in the presence of a small amount of an alkali metal hydroxide as a catalyst, for example, 0.1% to 0.2% by weight of sodium hydroxide based on the weight of the final adduct.

The invention is further illustrated but is not limited by the following example giving the best mode contemplated for the practice of the invention. In this example the quantities are given in parts by weight unless otherwise indicated.

Example

A composition was prepared by mixing together ethylene oxide and 1,2-propylene oxide to produce a mixture containing 60% by weight ethylene oxide and 40% by weight 1,2-propylene oxide. This mixture was then added to 900 parts of castor oil containing 2 parts of sodium hydroxide until the resultant product contained about 45% by weight of the mixed oxides. The addition was made by recirculating the mixed oxides into the castor oil at a temperature of 150° C. to 160° C. for a period of two to four hours.

The resultant product is a 45% by weight adduct of a mixture of 60% by weight ethylene oxide and 40% by weight 1,2-propylene oxide reacted with castor oil. This product was tested by subjecting it to temperatures of —20° C. for six days and showed no evidence of freezing at these temperatures. The product also passed a standard test for heavy duty brake fluids which requires that the product remain brilliantly clear when dissolved in a solvent and held at a temperature of —40° C. for six days. The above described product when mixed in proportions of 20 parts of said product with 80 parts of normal butyl alcohol showed no cloud after six days at —40° C. and is an excellent heavy duty brake fluid.

In a similar manner other compositions were prepared within the range specified and also outside of the range. It was noted that a certain minimum proportion of 1,2-propylene oxide is essential to obtain a composition which does not crystallize or tend to solidify at low temperatures. Thus, when the total amount of mixed oxides constituted about 40% by weight of the total adduct crystallization at a temperature of —20° C. began to occur if the 1,2-propylene oxide content of the mixed oxides was 20% by weight or less. A 30% to 40% by weight adduct of ethylene oxide alone reacted with castor oil was not liquid at —20° C.

Other examples of suitable specific compositions falling within the scope of the invention are:

(1) A 45% by weight adduct of castor oil and a mixture of 60% by weight 1,2-propylene oxide and 40% by weight ethylene oxide.

(2) A 45% by weight adduct of castor oil and a mixture of 50% by weight ethylene oxide and 50% by weight 1,2-propylene oxide.

(3) A 50% by weight adduct of castor oil and a mixture of 60% by weight ethylene oxide and 40% by weight 1,2-propylene oxide.

(4) A 50% by weight adduct of castor oil and a mixture of 50% by weight ethylene oxide and 50% by weight 1,2-propylene oxide.

(5) A 50% by weight adduct of castor oil and a mixture of 60% by weight 1,2-propylene oxide and 40% by weight ethylene oxide.

(6) A 55% by weight adduct of castor oil and a mixture of 60% by weight ethylene oxide and 40% by weight 1,2-propylene oxide.

(7) A 55% by weight adduct of castor oil and a mixture of 50% by weight ethylene oxide and 50% by weight 1,2-propylene oxide.

(8) A 55% by weight adduct of castor oil and a mixture of 60% by weight 1,2-propylene oxide and 40% by weight ethylene oxide.

In the foregoing compositions the expression "percent by weight adduct" refers to the total amount of mixed oxides in the oxyalkylated castor oil.

In addition to their stability at low temperatures, the compositions of the present invention do not swell rubber like ordinary oily materials and are therefore especially useful in hydraulic applications where the hydraulic fluid is brought into contact with rubber parts.

One advantage of using the compositions of the present invention as textile lubricants is that if the castor oil portion of the molecule is saponified by contact with alkalies or alkaline reacting substances the adduct continues to act as a lubricant. In other words, the compositions of the invention can be saponified to soap-like materials which are stable to alkalies and still retain the primary characteristics of non-ionic materials.

The invention is hereby claimed as follows:

1. An adduct of castor oil with a mixture of ethylene oxide and 1,2-propylene oxide mixed prior to reaction with the castor oil, in which the weight ratio of ethylene oxide to propylene oxide is within the range of 2:1 to 1:2 and the total mixed oxide content is within the range of 25% to 75% by weight of the adduct, said adduct being further characterized by the fact that it remains liquid and stable at a temperature of −20° C. for six days.

2. An adduct of castor oil with a mixture of ethylene oxide and 1,2-propylene oxide mixed prior to reaction with the castor oil, in which the weight ratio of ethylene oxide to propylene oxide is within the range of 2:1 to 1:2 and the total mixed oxide content is within the range of 40% to 60% by weight of the adduct, said adduct being further characterized by the fact that it remains liquid and stable at a temperature of −20° C. for six days.

3. An adduct of castor oil with a mixture of ethylene oxide and 1,2-propylene oxide mixed prior to reaction with the castor oil, in which the weight ratio of ethylene oxide to propylene oxide is within the range of 3:2 to 2:3 and the total mixed oxide content is within the range of 40% to 60% by weight of the adduct, said adduct being further characterized by the fact that it remains liquid and stable at a temperature of −20° C. for six days.

4. An adduct of castor oil with a mixture of about 60% by weight of ethylene oxide and about 40% by weight of 1,2-propylene oxide mixed prior to reaction with the castor oil, in which the total mixed oxide content is within the range of 40% to 60% by weight of the adduct, said adduct being further characterized by the fact that it remains liquid and stable at a temperature of −20° C. for six days.

5. An adduct of a mixture of castor oil with ethylene oxide and 1,2-propylene oxide mixed prior to reaction with the castor oil, in which the weight ratio of ethylene oxide to propylene oxide is within the range of 2:1 to 1:2 and the total mixed oxide content is approximately 45% by weight of the adduct, said adduct being further characterized by the fact that it remains liquid and stable at a temperature of −20° C. for six days.

6. An adduct of castor oil with a mixture of ethylene oxide and 1,2-propylene oxide mixed prior to reactor with the castor oil, in which the weight ratio of ethylene oxide to propylene oxide is within the range of 3:2 to 2:3 and the total mixed oxide content is about 45% by weight of the adduct, said adduct being further characterized by the fact that it remains liquid and stable at a temperature of −20° C. for six days.

7. An adduct of a castor oil with a mixture of about 60% by weight of ethylene oxide and about 40% by weight of 1,2-propylene oxide mixed prior to reaction with the castor oil, in which the total mixed oxide content is about 45% by weight of the adduct, said adduct being further characterized by the fact that it remains liquid and stable at a temperature of −20° C. for six days.

References Cited in the file of this patent

UNITED STATES PATENTS

| | | |
|---|---|---|
| 2,174,760 | Schuette et al. | Oct. 3, 1939 |
| 2,403,343 | De Groote | July 2, 1946 |